(12) United States Patent
Vernon

(10) Patent No.: US 11,305,709 B1
(45) Date of Patent: Apr. 19, 2022

(54) INTEGRATED VEHICULAR BATTERY BOOSTER AND JUMP STARTER

(71) Applicant: John Vernon, Palm Bay, FL (US)

(72) Inventor: John Vernon, Palm Bay, FL (US)

( * ) Notice: Subject to any disclaimer, the term of this patent is extended or adjusted under 35 U.S.C. 154(b) by 0 days.

(21) Appl. No.: 17/075,566

(22) Filed: Oct. 20, 2020

(51) Int. Cl.
| | | |
|---|---|---|
| *B60R 16/033* | (2006.01) | |
| *H02J 7/34* | (2006.01) | |
| *H02J 1/10* | (2006.01) | |
| *H02J 7/00* | (2006.01) | |

(52) U.S. Cl.
CPC ............ *B60R 16/033* (2013.01); *H02J 1/122* (2020.01); *H02J 7/342* (2020.01); *H02J 7/0042* (2013.01)

(58) Field of Classification Search
CPC ....... B60R 16/033; H02J 1/122; H02J 7/0042; H02J 7/342
USPC .................................................. 307/9.1, 10.1
See application file for complete search history.

(56) References Cited

U.S. PATENT DOCUMENTS

2017/0288435 A1\* 10/2017 Miller .................... G06F 1/263

\* cited by examiner

*Primary Examiner* — Hal Kaplan
(74) *Attorney, Agent, or Firm* — Steven Rinehart

(57) ABSTRACT

A battery boosting device adapted to be affixed internally to a vehicle, the battery boosting device comprising two or more sets of cables adapted to jump start an internal batter and/or an external battery.

9 Claims, 6 Drawing Sheets

INTEGRATED VEHICULAR BATTERY BOOSTER AND JUMP STARTER

BACKGROUND OF THE INVENTION

Field of the Invention

This invention relates to vehicular battery technologies and more particularly relates to an apparatus for jumpstarting one or more vehicles with depleted batteries.

Description of the Related Art

Automobiles are typically powered by a lead battery or a lithium ion battery as known to those of skill in the art. Starting the engines in vehicles requires a starter which drains large amounts of current from the battery as the starter must be large enough to turn the engine. The battery is connected to the starter via the ignition switch inside the vehicle.

Because many systems, in addition to the starter, run on the automotive battery, including the stereo, lights, instruments, climate control, accessories, electric doors and others, it is common for car batteries to become inadvertently depleted.

Typically, when a battery becomes depleted, the depleted battery must be jump started using either another battery or a high current battery pack. Alternatively, a high output portable desulfator may be used to restore the depleted battery over a longer period of time. Problems can often arise in arranging this jump start when either the jumper terminals or clamps of the cables are inadvertently brought into contact with each other while opposing ends are connected to a charged battery, or when the positive and negative terminals are connected to the opposite polarity terminals in the vehicle to be jumped, thereby causing a short circuit resulting in sparking, fires, and potential damage to batteries and/or bodily injury. Entire electrical systems of vehicles are often ruined in this manner. Batteries may be inadvertently connected in series or in parallel. Additionally, if the jumped battery is not entirely depleted, route jump starting procedure can increase the overall voltage across the electrical systems of both involved vehicles to the point where fuses blow or systems are damaged. This voltage increase my be mitigated by grounding a live terminal, but operators performing jump starting operations seldom have measured the voltage or understand the importance of grounding either vehicle.

It is an object of the present invention is to provide a power supply device for an automobile with an integrated jump starter. There exist no means in the art of efficiently jump starting vehicles. Thus, it is desirable to provide such an apparatus.

SUMMARY OF THE INVENTION

From the foregoing discussion, it should be apparent that a need exists for an integrated vehicular battery booster and jump starter. Beneficially, such a system would overcome many of the difficulties of the prior art by providing an integrated vehicular battery booster comprising: a housing defining a hollow interior recess, the housing comprising: a plurality of lithium-ion cells connected in one of: series and parallel; a three-way switch adapted to alternatively direct power: from a battery within an automobile to the battery booster via a primary set of cables; to a battery within the automobile via the primary set of cables; and to a battery external to the vehicle via a secondary set of cables; the primary set of cables affixed to two or more annular washers, the washers adapted to affix to terminals of the internal battery; the secondary set of cables affixed to two or more alligator clips, the alligator clips adapted to affix to terminals of the external battery.

The housing may further comprise a plurality of mounting brackets. In some embodiments, the apparatus further comprises three or more lithium-ion power cells. In still further embodiments, the housing additionally comprises two or more PCB boards.

The primary cables and the secondary cables may be interconnected on the same circuit. The apparatus may further comprise a faceplate having a plurality of USB ports.

The housing may define an open end through which the lithium-ion cells are received. The apparatus may further comprise a planar plate adapted to slidably affix to the housing.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
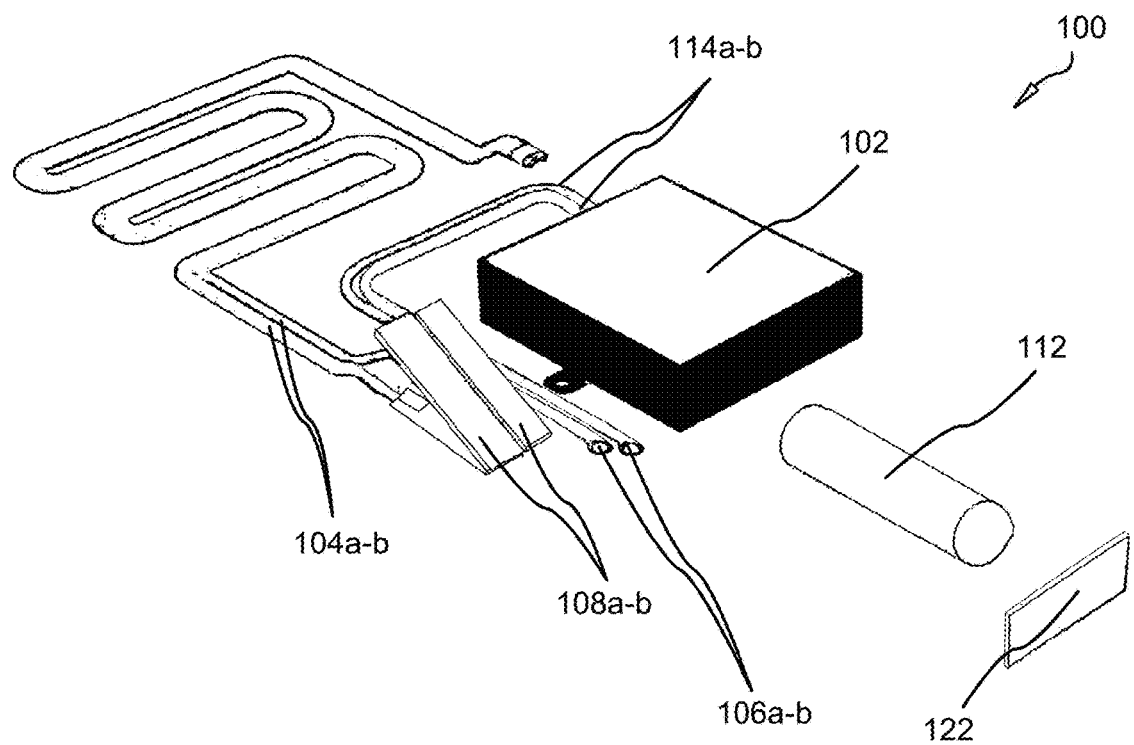
FIG. 1 is an isometric perspective view of an integrated vehicular battery booster and jump starter in accordance with the present invention.
Figure 2:
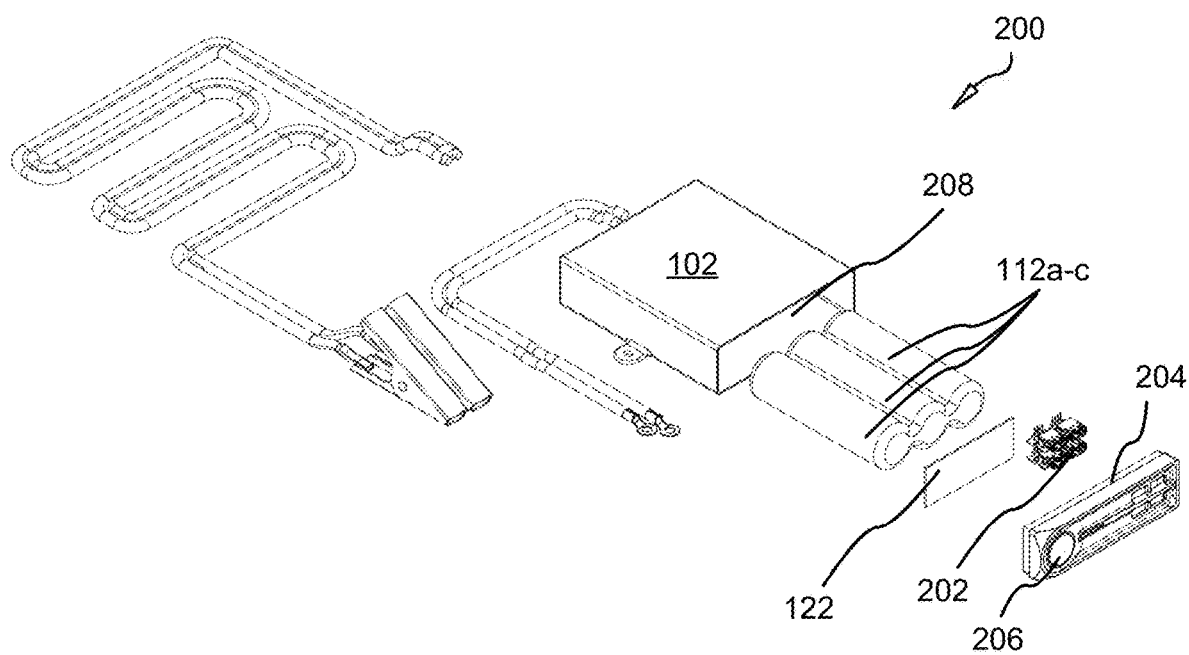
FIG. 2 is an isometric perspective view of an integrated vehicular battery booster and jump starter in accordance with the present invention.

FIGS. 1-2 is an isometric perspective view of an integrated vehicular battery booster and jump starter 100, 200 in accordance with the present invention.

The apparatus 100 comprises a housing 102 which receives one or more cells 112. Each cell, in the shown embodiments, is capable of producing an average discharge current greater than 18 amps. In the shown embodiment, the battery cells 112 are lithium-based, but may be formed from any battery technology known to those of skill in the art. The battery cells 112 may be connected in series, or in parallel, within the housing 102.

The apparatus 200 may comprises a faceplate 204 having a plurality of controls, including a manual switch 206 for activating the apparatus 200 and imparting currents to the terminals 108a-b. The switch 206 may comprise a three-way switch adapted to impart electrical currently alternatively to either a battery 402 integrated into a vehicle, including stock vehicles, or alternatively through the primary cables 104 and the alligator clips 108 to jump start a battery external to the vehicle 404 within which the battery 402 is housed. In these embodiments, using the switch 206, current is alternatively directed from or to the housing 102 and its housed components 112, 122, 202, 204.

In various embodiments, the housing 102 comprises an open forward end 208 through which the cells 112 are inserted into the housing 102. A forward plate 122 may dispose over the open forward end 208. The forward plate 122 may slide into a track defined on, or by, the open forward end 208.

The apparatus 200 may also comprise one or more PCB boards 202 adapted to impart remote control over the switch 206 from a dashboard of an automotive vehicle.

The faceplate 204 positions over the forward plate 122.

The secondary cables 114 are adapted to be semi-permanently affixed to an internal battery 402 within a vehicle 404 using threaded screws affixed to the terminals of the battery 402. In a default position, the switch 206 is spring-biased to return to a default position in which current is directly from the battery 402 to the cells 112. The cables 114 each comprise annular washers 106 which affix on, or over, the terminals of the battery 402.

The switch 206 may be manually activated to jump start the battery 402 by directing current from the cells 112 to the battery 402.

Figure 3:
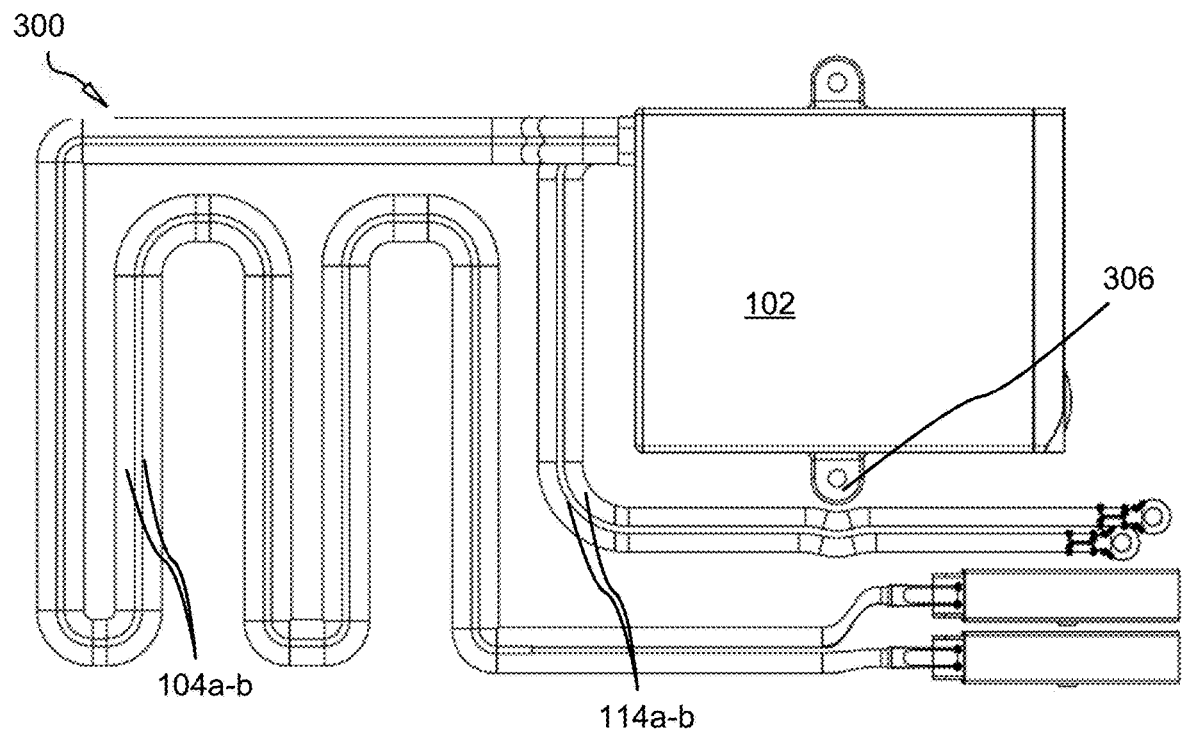
FIG. 3 is an upper perspective view of an integrated vehicular battery booster and jump starter in accordance with the present invention.
Figure 4:
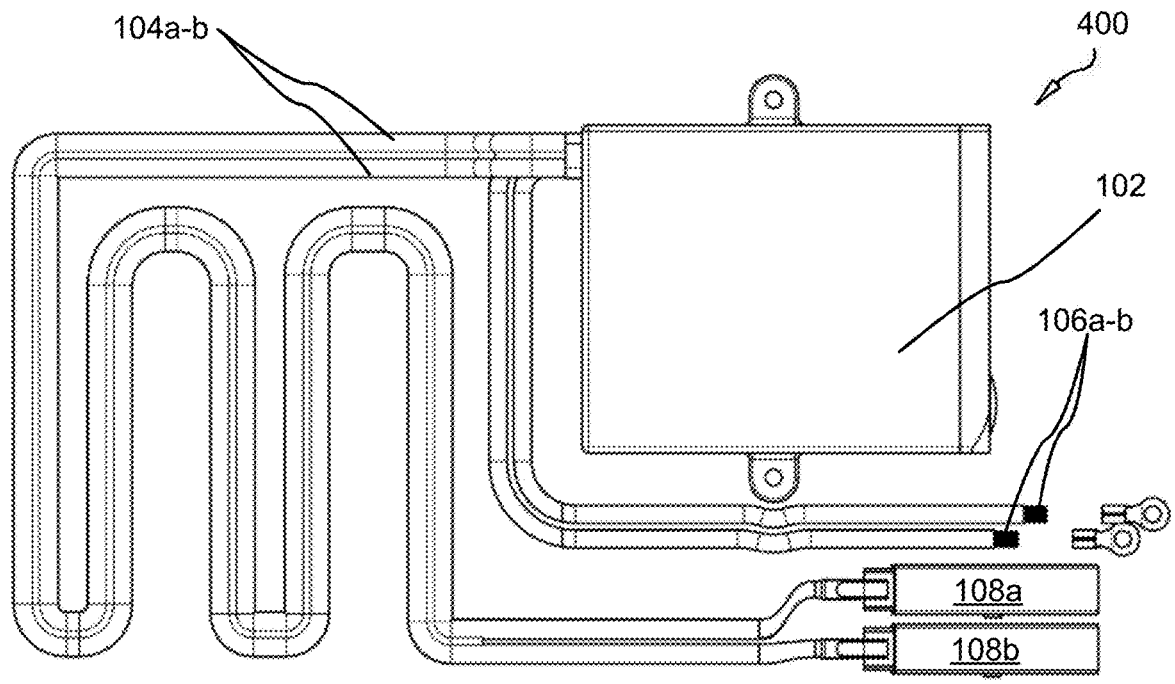
FIG. 4 is an upper perspective view of an integrated vehicular battery booster and jump starter in accordance with the present invention.

FIGS. 3-4 depict an upper perspective view of an integrated vehicular battery booster and jump starter 300, 400 in accordance with the present invention.

The housing 102 comprises mounting brackets 306 adapted to affix the housing internally to an automobile 404.

In some embodiments, the secondary cables 114 divert from the primary cables 104 such that the secondary cables 114 and the primary cables 104 are connected to same current on the same circuit. In other embodiments, the primary cables 104 and the secondary cables 114 are on different circuits, each selectively interconnectable with the cells 112 via the switch 206.

Figure 5:
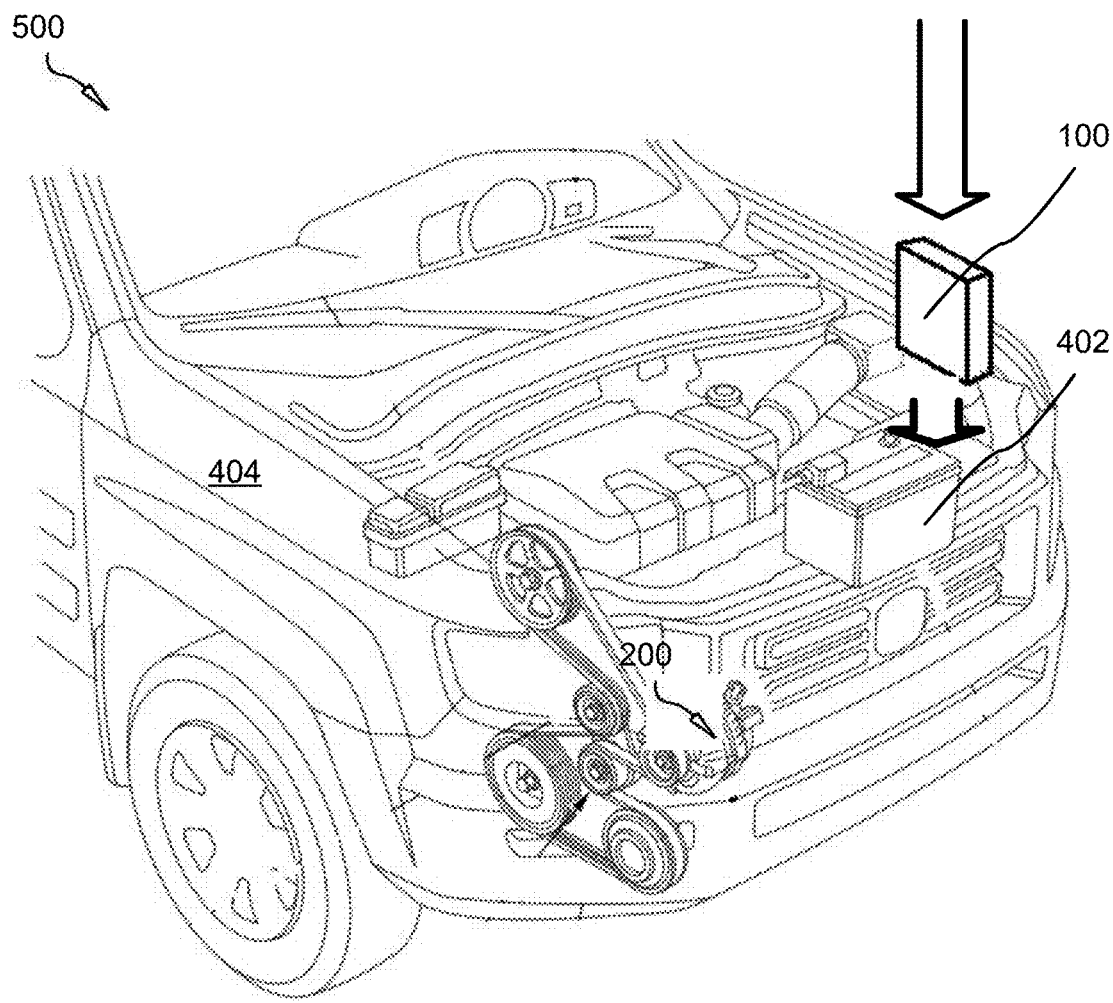
FIG. 5 is an environmental perspective view of an integrated vehicular battery booster and jump starter in accordance with the present invention.
Figure 6:
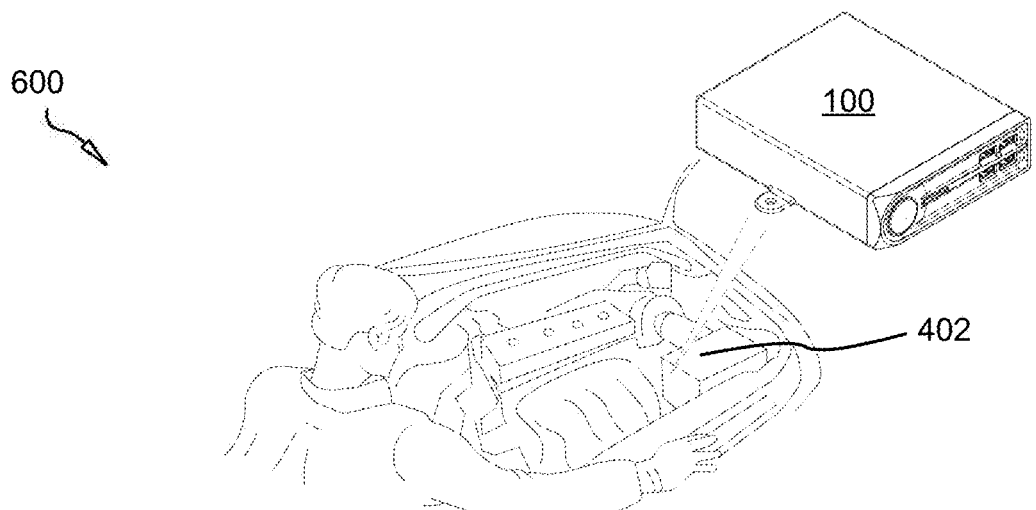
FIG. 6 is an environmental perspective view of an integrated vehicular battery booster and jump starter in accordance with the present invention.

FIGS. 5-6 depict environmental perspective view of an integrated vehicular battery booster and jump starter 500, 600 in accordance with the present invention.

In various embodiments, the apparatus 100 affixes internally within the vehicle 404. The apparatus 100 may affix to the frame; or, in some embodiments, adjacent to the battery 402 itself.

Figure 7:
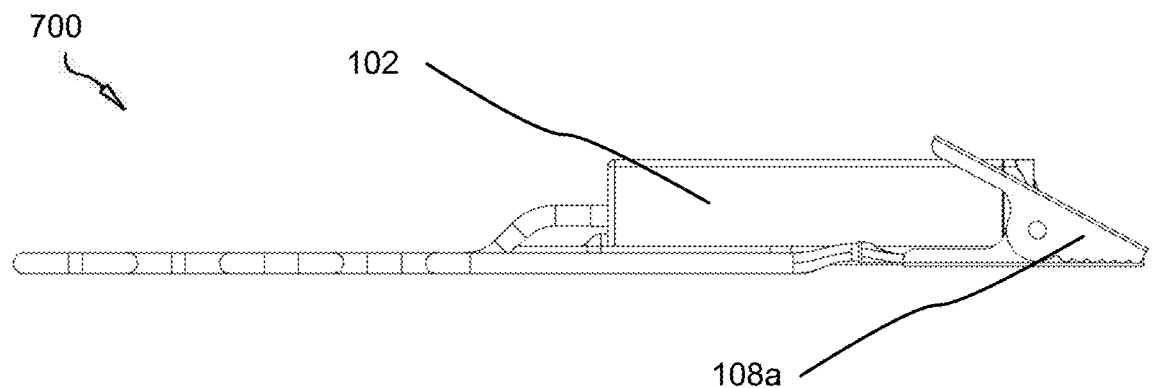
FIG. 7 is a left side perspective view of an integrated vehicular battery booster and jump starter in accordance with the present invention.

FIG. 7 is a left side perspective view of an integrated vehicular battery booster and jump starter 700 in accordance with the present invention.

As shown.

Figure 8:
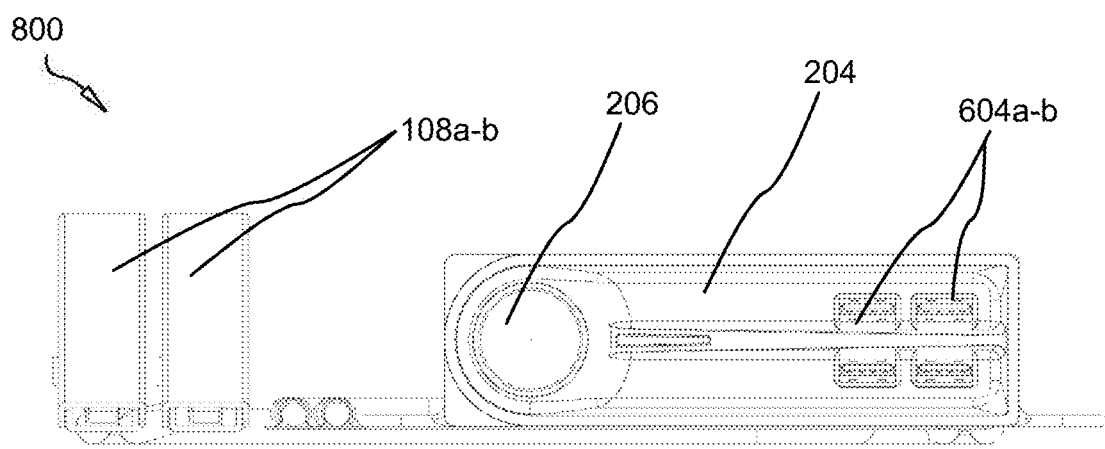
FIG. 8 is a forward perspective view of an integrated vehicular battery booster and jump starter in accordance with the present invention.

FIG. 8 is a forward perspective view of an integrated vehicular battery booster and jump starter 800 in accordance with the present invention.

The faceplate 204 may comprise the switch 206 and additionally or alternatively a plurality of ports 604 for directly powering devices external to the apparatus 800, including, in some embodiments, USB ports as shown.

Figure 9:
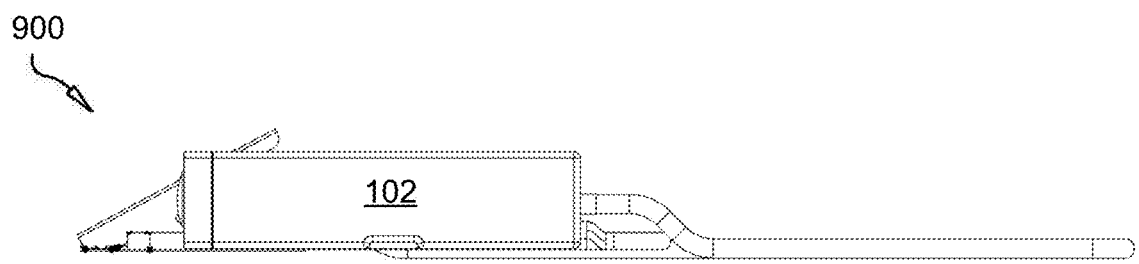
FIG. 9 is a right side perspective view of an integrated vehicular battery booster and jump starter in accordance with the present invention.

FIG. 9 is a right side perspective view of an integrated vehicular battery booster and jump starter 900 showing a housing with the terminals 108 to the left of the housing 102.

Figure 10:
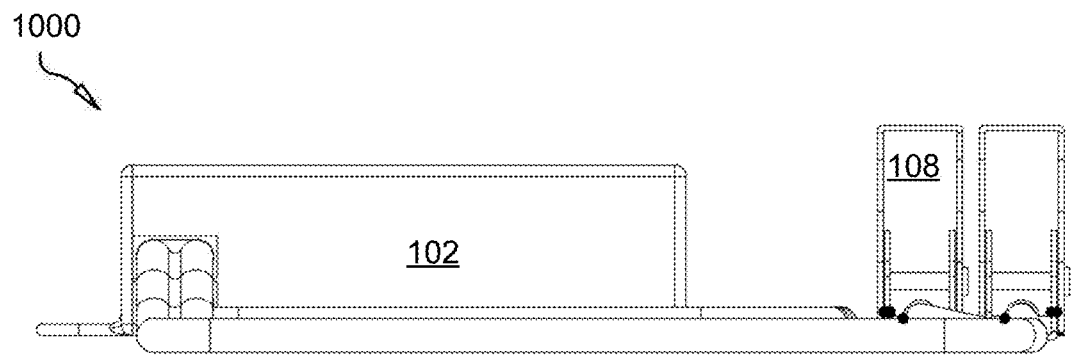
FIG. 10 is a right side perspective view of an integrated vehicular battery booster and jump starter in accordance with the present invention.
Figure 11:
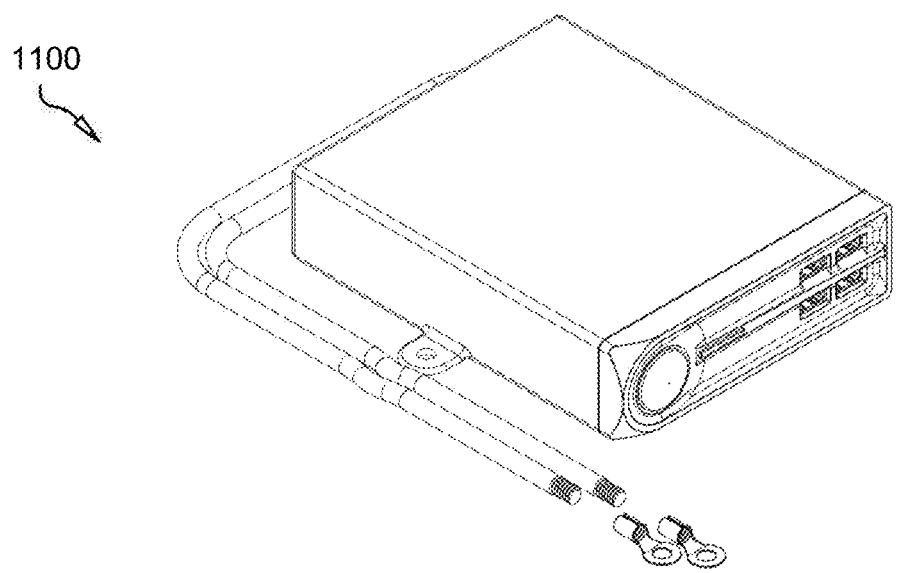
FIG. 11 is an isometric perspective view of an integrated vehicular battery booster and jump starter in accordance with the present invention.

FIG. 10 is a right side perspective view of an integrated vehicular battery booster 1000 showing one embodiment of the housing 102 with the primary cables 104 protruding from the right side of the housing 102. FIG. 11 is an isometric perspective view of an integrated vehicular battery booster and jump starter 1100 showing the primary cables protruding from the rear of the housing 102.

Figure 12:
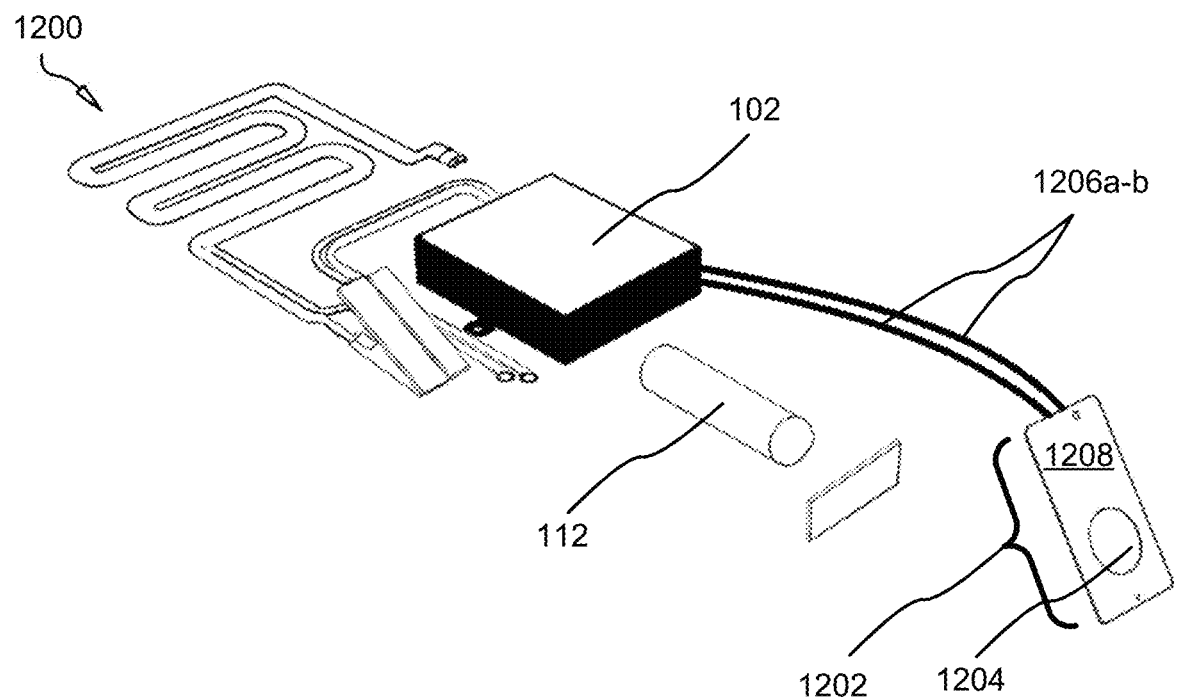
FIG. 12 is an isometric perspective view of an integrated vehicular battery booster and jump starter in accordance with the present invention.

FIG. 12 is an isometric perspective view of an integrated vehicular battery booster and jump starter 1200 in accordance with the present invention.

In various embodiments, the apparatus 1200 comprises a dashboard-mounted switch 1202. The switch 1202 comprises a depressible button 1204 which may be activated using tensile force by a driver to jump start a dead vehicular battery 402. The switch 1202 interconnects apparatus 1200 with vehicular controls inside the automobile, and permits apparatus 1200 functionality from inside the cab of the vehicle. The switch 902 may operate in substantially the same way as the switch 206. The switch 1202 may be interconnected to the housing 102 using two or more wires 1206 or cables adapted to interconnect the switch 1202 within the circuit activating the apparatus 1200. The switch 1202 may comprise a baseplate 1208 for permanently affixed to a dashboard.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated vehicular battery booster comprising:
a housing defining a hollow interior recess, the housing comprising:
 a plurality of lithium-ion cells connected in one of: series and parallel;
 a three-way switch adapted to alternatively direct power: from a battery within an automobile to the battery booster via a primary set of cables; to a battery within the automobile via the primary set of cables; and to a battery external to the vehicle via a secondary set of cables;
the primary set of cables affixed to two or more annular washers, the washers adapted to affix to terminals of the internal battery;
the secondary set of cables affixed to two or more alligator clips, the alligator clips adapted to affix to terminals of the external battery.

2. The apparatus of claim 1, wherein the housing further comprises a plurality of mounting brackets.

3. The apparatus of claim 1, further comprising three or more lithium-ion power cells.

4. The apparatus of claim 1, further comprising two or more PCB boards.

5. The apparatus of claim 1, wherein the primary cables and the secondary cables are interconnected on the same circuit.

6. The apparatus of claim 1, further comprising a faceplate having a plurality of USB ports.

7. The apparatus of claim 1, wherein the housing defines an open end through which the lithium-ion cells are received.

8. The apparatus of claim 1, further comprising a planar plate adapted to slidably affix to the housing.

9. The apparatus of claim 1, further comprising a dashboard-mounted switch comprising a baseplate, a depressible button, and a plurality of conductive cables.

* * * * *